May 1, 1923.

J. F. RULE 1,453,285

APPARATUS FOR GATHERING AND TRANSFERRING MOLTEN GLASS

Filed Oct. 24, 1919

WITNESS
Leonard Soubier

INVENTOR
J. F. Rule

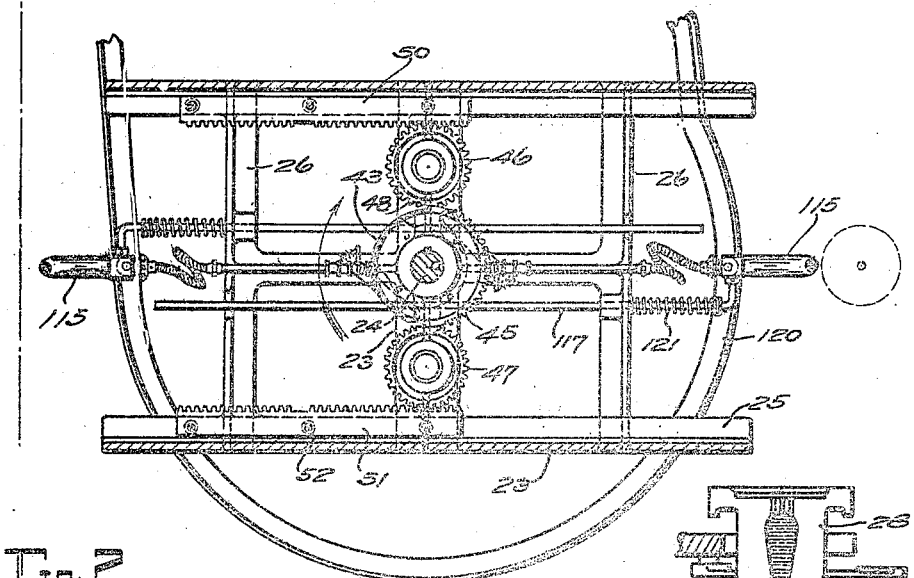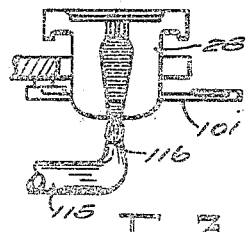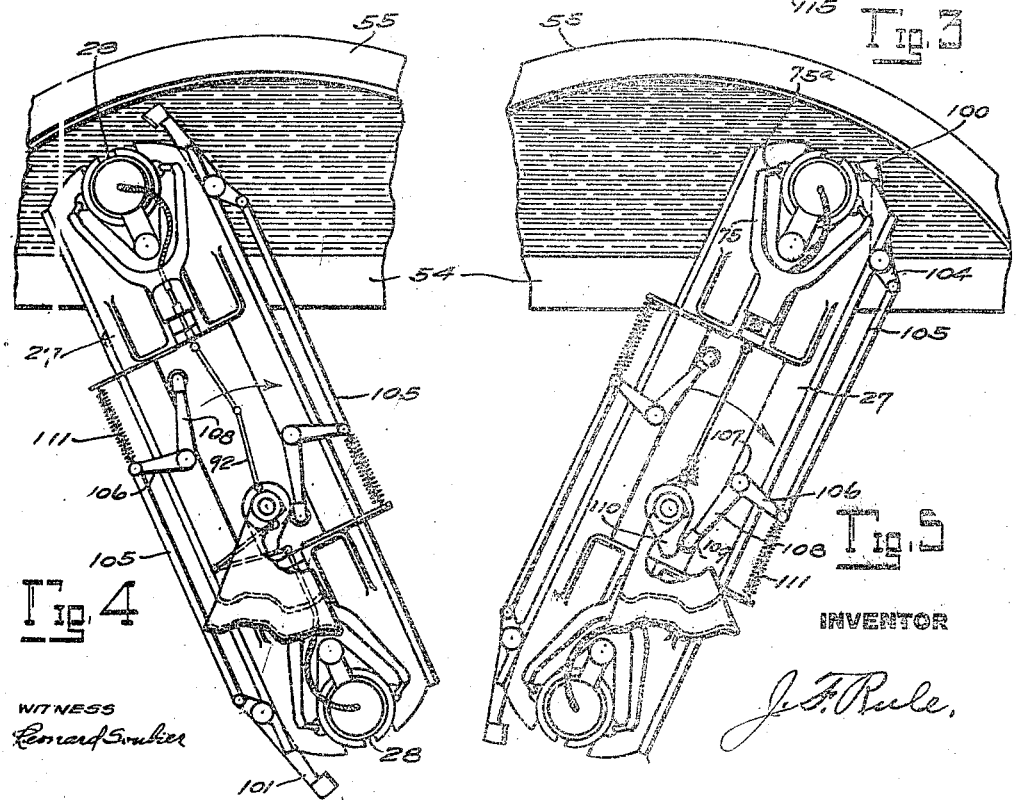

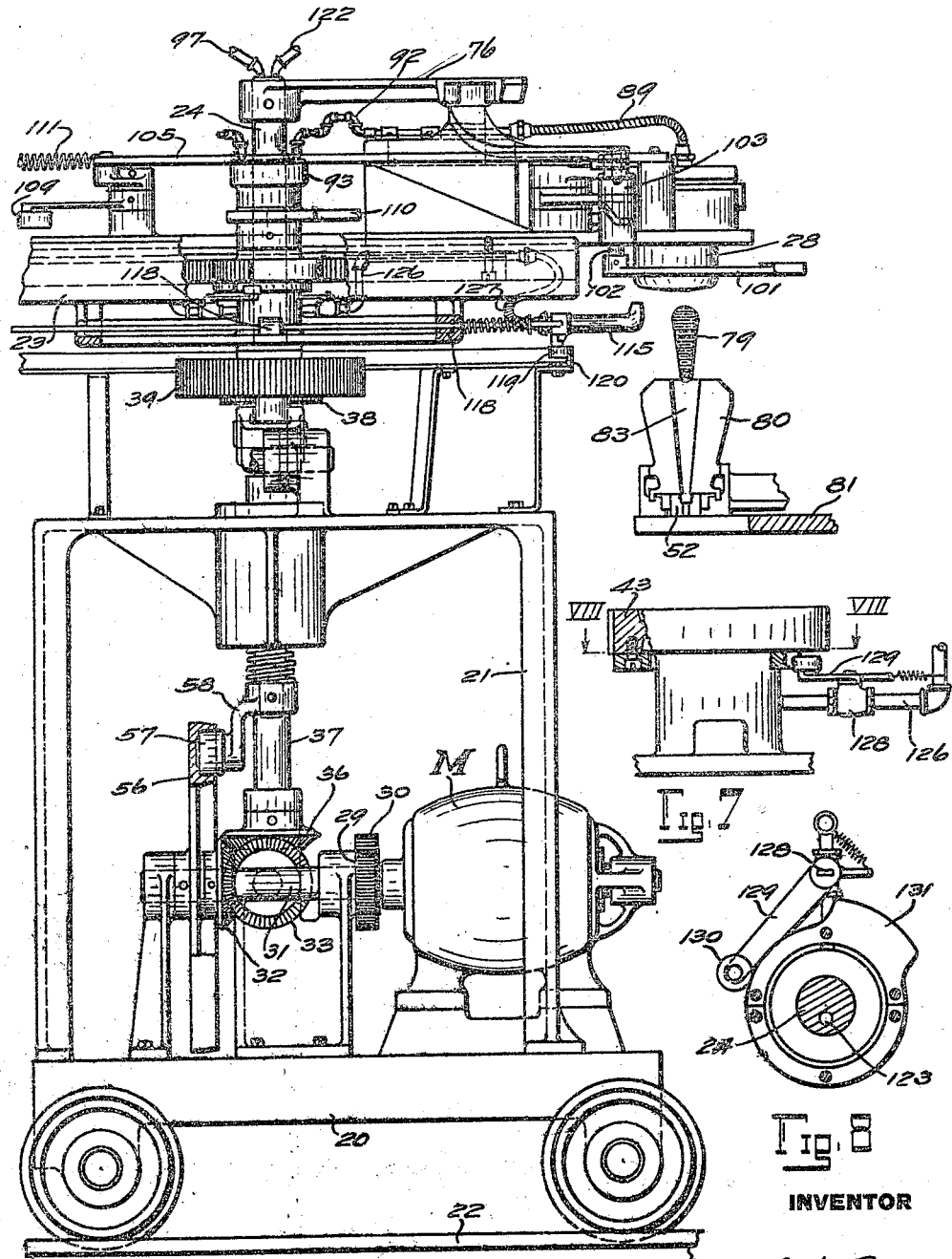

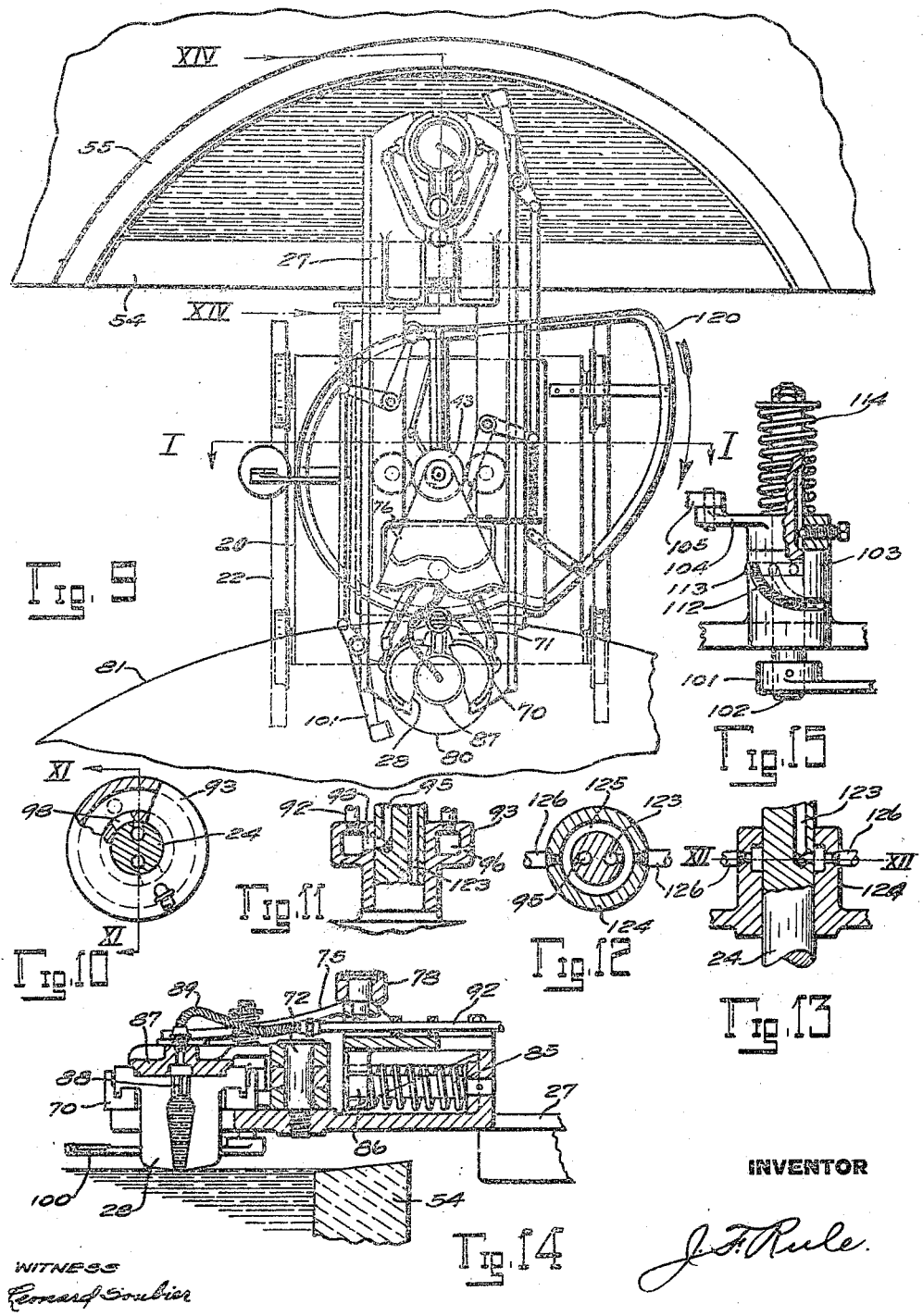

Patented May 1, 1923.

1,453,403

UNITED STATES PATENT OFFICE.

JOHN F. RULE, OF TOLEDO, OHIO, ASSIGNOR TO THE OWENS BOTTLE COMPANY, OF TOLEDO, OHIO, A CORPORATION OF OHIO.

APPARATUS FOR GATHERING AND TRANSFERRING MOLTEN GLASS.

Application filed October 24, 1919. Serial No. 332,987.

*To all whom it may concern:*

Be it known that I, JOHN F. RULE, a citizen of the United States, residing at Toledo, in the county of Lucas and State of Ohio, have invented new and useful Improvements in Apparatus for Gathering and Transferring Molten Glass, of which the following is a specification.

My invention relates to apparatus for gathering charges or gobs of glass by suction into a transfer receptacle and transferring them to molds or other receptacles. An object of the invention is to provide suitable means for segregating the individual charges from the supply of molten glass, giving them suitable shape for entering the molds, maintaining the glass in a hot, plastic and homogeneous condition during such transfer and quickly transferring the glass while in such condition to the molds. A further feature of the invention consists in providing means for applying a reheating flame to the lower end of the gob of glass while in the transfer cup, thereby remelting the glass which has been chilled by the cutter and eliminating the shear mark. This reheating of the glass is also of special value in connection with inverted molds for forming bottles and the like, as it renders the end of the gob which first enters the mold sufficiently hot and plastic to readily take the form of the mold. Other features of the invention will appear hereinafter.

In the accompanying drawings:

Figure 2 is a sectional plan of the rotating frame carrying the transfer cups, the section being at the line II—II on Figure 1.

Figure 3 shows a transfer cup with the reheating flame directed against the glass in the cup.

Figure 4 is a plan view showing the position of the gathering apparatus when it has reached the position at which the gathering cup dips into the glass.

Figure 5 is a similar view with the gathering cup advanced to the position at which it is lifted away from the glass.

Figure 6 is a part sectional elevation of the machine looking in a direction at right angles to that of Figure 1.

Figure 7 is a detail showing one of the valves controlling the supply of gas to the burners, and the cam for operating said valves.

Figure 8 is a sectional plan of the same at the line VIII—VIII on Figure 7.

Figure 9 is a plan view of the apparatus.

Figure 10 is a detail showing a head through which the vacuum pipes leading from the molds are connected to the vacuum.

Figure 11 is a section at the line XI—XI on Figure 10.

Figure 12 is a section at the line XII—XII on Figure 13.

Figure 13 is a sectional view of the head through which gas is distributed to the burners.

Figure 14 is a section at the plane indicated by the line XIV—XIV on Figure 9, and shows a transfer cup and means for opening and closing the same.

Figure 15 is a detail view of a portion of the knife operating mechanism.

Figure 1:
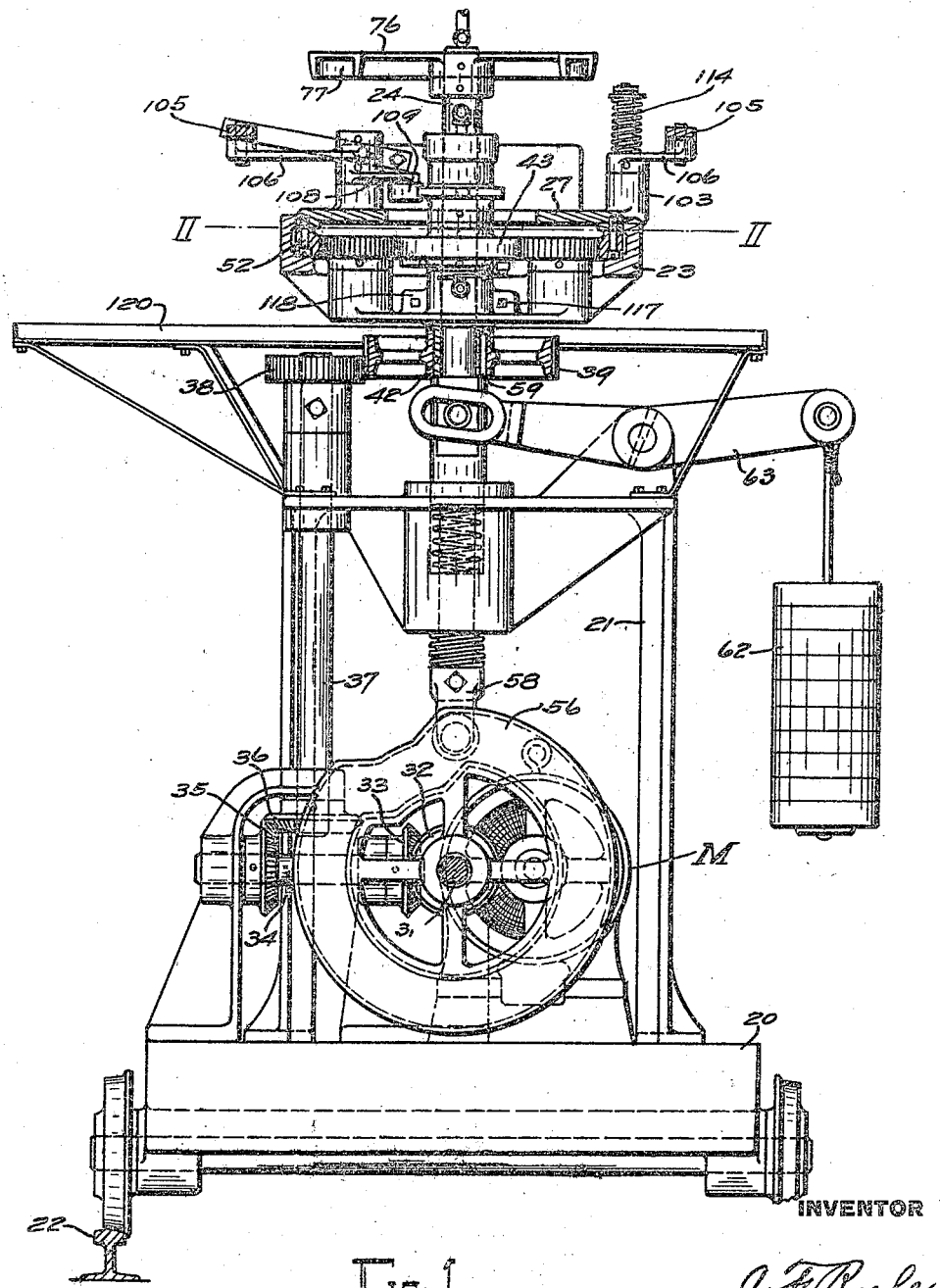
Figure 1 is a part sectional elevation of a machine embodying the principles of my invention, the upper portion of the figure being in section at the plane of the line I—I on Figure 9.

The machine as shown includes a base 20 on which is mounted a stationary frame 21, the entire machine being mounted on wheels to run on tracks 22 for moving the machine to and from the furnace or glass tank. A horizontally disposed rectangular frame 23 is mounted for continuous rotation about a vertical non-rotating shaft 24. The frame 23 comprises angle bars 25 forming the sides of the frame, and transverse bars or brackets 26. A frame 27 carrying transfer cups 28 is mounted on the frame 23 to rotate therewith and to reciprocate horizontally thereon.

The driving mechanism comprises an electric motor M mounted on the base 20 and operating through gears 29 and 30 to drive a horizontal shaft 31 on which is a bevel gear 32 meshing with a gear 33 on a horizontal shaft 34. Motion is transmitted from the shaft 34 through bevel gears 35 and 36 to a vertical shaft 37, the upper end of which carries a pinion 38 meshing with a gear 39 mounted concentric with the non-rotating shaft 24. The gear 39 is keyed to a hub or sleeve 42 which depends from and forms part of the frame 23. It will be seen that when the motor is running, motion is transmitted through the train of gears just described to the frame 23, thereby causing the latter to rotate continuously about its vertical axis. The frame 27 rotates with the frame 23 and in addition has a reciprocating movement imparted thereto by the following means:

A mutilated gear 43 is keyed to the non-rotating shaft 24 and is provided on one-half or less of its periphery with gear teeth 45. Gear pinions 46 and 47 are journalled in the frame 23 so that they revolve about the shaft 24 as a center while said frame rotates. These pinions are provided with locking surfaces 48 to interlock with the wheel 43 when said pinions are in the Figure 2 position. As the frame 23 rotates in the direction of the arrow (Fig. 2) the teeth on the pinion 46 mesh with the gear teeth 45 on the gear 43 while said pinion 46 travels along the right hand side of said gear. The pinion is thus rotated on its own axis and thereby drives a rack 50 which is in mesh with said pinion. The rack 50 and a corresponding rack 51 in mesh with the pinion 47 are secured to the frame 27 by bolts 52 (Fig. 1) and form part of said frame. The frame 27 is thus driven toward the right (Fig. 2) while the pinion 46 is running in mesh with the teeth 45 on the stationary gear 43. In this manner the frame 27 is moved outwardly relative to its center of rotation during substantially a half rotation. The gear 46 makes a complete rotation about its axis while the frame 23 is making a half revolution. This brings the gear 46 to the lower side of the gear 43, or in other words into the position in which the pinion 47 is shown on Figure 2. While the gear 46 is in mesh with the gear 43 and driving the rack 50, the gear 47 is being driven idly by the rack 51. During the next half revolution of the frame 23 the pinion 47 is driven by the gear teeth 45 and returns the frame 27. One purpose of reciprocating the frame 27 as it rotates is to project the gathering cups 28 outwardly over the edge of the gathering tank 54 into position to gather the glass. Each cup is held in such projected position for a limited time while traveling over the tank, by means of the interlocking of the gears as shown in Figure 2.

The tank 54 may be provided with a concave jack arch 55 to expose a portion of the surface of the glass for gathering. Any suitable means may be provided for maintaining a movement of the glass past the gathering point if desired, such as shown, for example, in my co-pending application, Serial Number 306,059. The glass may also be gathered from a revolving tank such as is in common use with machines which gather by suction.

The rotating frame may be given a vertical reciprocating movement to cause the gathering cups 28 to dip into the glass. This reciprocating movement is effected by a cam 56 which is keyed to the shaft 31 to rotate therewith. This cam is provided with a cam groove in which runs a roll 57 on an arm 58 secured to the lower end of the vertical shaft 24. The frame 23 is supported on said shaft by means of the hub 42 which rests on a shoulder 59 formed on the shaft so that the entire rotating frame-work is moved up and down by the cam 56. The cam is so shaped that the frame will be lowered to dip a cup 28 into contact with the glass when it is in the Figure 2 position. The cup then travels horizontally with its gathering end in the glass until it reaches the Figure 3 position, at which point it is lifted by the cam 56 so that it will clear the edge of the tank. When the cup at the opposite end of the frame reaches the Figure 2 position, the frame is again lowered. A counter-weight 62 is connected through a lever 63 to the shaft 24 and counterbalances the weight or part of the weight of the vertically moving parts.

Each of the suction gathering cups 28 comprises two sections seated in holders 70, (Figs. 9 and 14), the latter having arms 71 journalled on a vertical pivot pin 72 mounted on the frame 27. A yoke 75 is connected through links 75a to the mold supports 70, said yoke being mounted for reciprocating movement lengthwise of the frame 27 and being thereby operable to separate the cup sections 28 for discharging a gob of glass. The yoke 75 is actuated by means of a stationary cam 76 having a cam groove 77 through which a cam roll 78 carried by the yoke 75 travels while the cup is passing the discharging position. This position is reached for each gathering cup while the other cup is receiving its charge. When the cup sections are separated by means of the cam 76 a gob of glass 79 is permitted to drop therefrom into a mold 80, which at this time is directly beneath the cup. As shown in Figure 6, the mold 80 is an inverted blank mold mounted on a rotating mold table 81 of a bottle-forming machine. Beneath the blank mold 80 and in register therewith is a neck mold 82 for forming the neck of the bottle. The mold cavity 83 in the blank mold is larger at its upper end, being tapered downwardly and inwardly toward the neck mold. The cavity in the gathering cup 28 is also tapered, so that the shape of the gob will approximate that of the mold.

The bottle forming machine may be geared to the gob transferring machine herein shown, or may be driven by the same motor M, whereby the movements of the two machines are synchronized and the transfer cups are operated to transfer a charge of glass to each blank mold as said molds are brought successively to the charging position. The sections of the cup 28 are held together by means of a spring 85 interposed between a shoulder on the frame 27 and a lug 86 connected to the yoke 75.

The molten glass is gathered into the cups 28 by means of suction. For this purpose a vacuum head 87 is provided for each cup. Restricted openings 88 provide communication between the cup cavity and the cavity in the head 87. The air is exhausted through a flexible pipe 89 connected to said head at one end and at its opposite end connected to a jointed pipe 92 leading to a head 93 (Figs. 6, 10, 11). This head 93 is mounted on the frame 23 to rotate therewith and surrounds the stationary shaft 24. The latter is provided with a longitudinal bore 95 communicating with an annular chamber 96 in the head 93. A vacuum pipe 97 connected with the bore 95 at the upper end of the shaft 24 extends to any suitable source of vacuum. It will thus be seen that the air is exhausted from the gathering cup through the passageways 88, head 87, pipes 89, 92, head 93 and passageways 95, 97. Vacuum is supplied to each gathering cup only while the latter is in gathering position over the tank, at which time a port 98 (Figs. 10 and 11) provides communication between the chamber 96 and the passageway 95. The head 93 is provided with two oppositely disposed ports 98 to connect the two gathering cups alternately with the vacuum.

A cutter 100 is provided in connection with each gathering cup to sever the charge of glass therein from the glass in the tank as the cup is lifted after receiving its charge. The knife is carried on a horizontal arm 101 connected to a vertical rock shaft 102, the latter mounted to rock in a bearing sleeve 103 on the frame 27. A rock arm 104 on the shaft 102 is connected through a link 105 to an arm 106 on a rock shaft 107. An arm 108 on the shaft 107 carries a cam roll 109 which runs on a stationary cam 110 mounted on the shaft 24. A spring 111 holds the roll 109 against the cam. The knife is operated as the gathering cup moves beyond the Figure 5 position, at which the cup has just received its charge. The combined radial and rotary movement of the frame 27 at this time causes a quick action of the knife. The knife arm 101 is normally in a position above the bottom of the gathering cup in order to clear the wall of the tank, but is moved downward to its cutting plane by means of an inclined cam slot 112 in the sleeve 103, in which slot works a pin 113 on the shaft 102. A spring 114 exerts an upward tension on the rock shaft 102.

Burners are provided for applying a reheating flame to the lower end of the gob of glass in the transfer cup while the latter is moving between the charging and discharging positions. These burners 115 may be provided with vertical nozzles 116 to direct the flame against the glass in the lower open end of the transfer cup. The flame serves to remelt the glass which has been chilled by the cutter and thus eliminates the shear mark which would otherwise produce a defect in the finished ware. This reheating may be sufficient to raise the temperature of the lower end of the gob to a higher degree than the body of the gob, thus adapting it to readily conform to the shape of the neck mold of the bottle where the chilling effect of the mold is greatest and where the glass must be comparatively soft to properly conform to the mold. The bottom of the cup being open, the glass gradually protrudes or elongates downward below the bottom of the cup. This causes a stretching and thinning of the outer layer or skin of glass that has been chilled by the cutter and permits it to be more or less reheated from the interior of the mass. It also exposes the glass to the burner flame so that the latter envelops the protruding end of the gob.

Each of the burners 115 is carried on a rod 117 which is slidable longitudinally in lugs 118 in the frame 26. These rods and the openings in said lugs may be square as indicated in Figure 1 to prevent rotation of the rod about its axis. Each burner carries a cam roll 119 which is held against a cam 120 by a spring 121. The cam 120 is so shaped that the burner is held in a retracted position until the gathering cup with its charge has passed beyond the tank. The burner is then projected to bring its nozzle directly beneath the cup in which position it is held to travel with the cup until the latter nears its discharging position when the burner is again retracted, permitting the discharge of the gob.

Gas for the burners is supplied through a pipe 122 (Fig. 6) connected at the upper end of the shaft 24 with a vertical passageway 123 in said shaft, said passageway leading to a distributing head 124 (Figs. 12 and 13) surrounding the shaft 24. Said head is formed with an annular passageway or chamber 125 from which extend pipes 126, each comprising a flexible section 127 connected to a burner 115. In order that the gas may be supplied to a burner only while the latter is beneath the gathering cup, a valve 128 (Figs. 7 and 8) is provided in the pipe 126. The valve stem carries an arm 129 having a cam roll 130 which runs on a stationary cam 131 surrounding the shaft 24. Said cam as shown is attached to the gear 43. This cam holds the valve open while the burner is in operative position. If desired, the valve may permit a sufficient flow of gas at all times to keep the burner lighted, although ordinarily the heat of the glass in the cup will serve to automatically light the gas.

The operation may be summarized as follows:

The frame 23 is rotated continuously about a vertical axis. The cup carrying frame 27 rotates with the frame 23 and is also caused to reciprocate by means of the gearing shown in Figure 2, so that each gathering cup 28 while passing the tank is projected over the glass in the tank. The cam 56 lowers the cup carrying frame to dip the lower end of the gathering cup into the molten glass. Suction is then applied to the cup while the latter is traveling in contact with the glass, so that the cup cavity is filled with molten glass. The cam 56 then lifts the carriage 23 and the knife 100 is moved across the bottom of the cup and severs the glass therein from the string of glass which projects from the cup as the latter is lifted. When the knife is withdrawn, or shortly thereafter, the burner 115 is projected so that its nozzle is directly beneath the cup and throws a flame against the end of the gob which protrudes from the lower open end of the cup. The burner travels with the cup to maintain the flame against the glass until the cup nears the discharging position, when the burner is withdrawn and the flame cut off by the cam actuated valve 128. When the transfer cup reaches a position directly over a mold 80 on the mold carriage the cam 76 opens the cup and drops the gob into the mold. The mold carriage may be either of the continuously or intermittently rotating type. If desired, any suitable means may be interposed between the transfer cup and the molds for directing the gobs into the latter.

Modifications may be resorted to without departing from the spirit and scope of my invention.

What I claim is:

1. The combination of means for gathering, shaping and transferring charges of molten glass, comprising a carrier rotatable about a vertical axis, a glass gathering and forming receptacle on said carrier, means to lower said receptacle into contact with a supply of molten glass, means to charge said receptacle by suction, means to sever the glass in the receptacle from the supply body of glass, a burner supported on said carrier, means to project said burner into operative relation to the gathering receptacle and cause it to direct a heating flame against the end of the glass that has been in contact with the cutter, said burner traveling with the gathering cup during said heating operation, means to withdraw the burner, and means to transfer the glass to a mold.

2. The combination of a carrier, means to rotate it continuously about a vertical axis, a gob gathering and forming receptacle thereon open at its lower end to receive a charge of molten glass, means to dip said receptacle into a pool of glass and fill it by suction, a knife on said carrier, means to move it laterally across the lower end of said receptacle for shearing the glass, a burner supported on said carrier, means to project the burner laterally to a position beneath the gob of glass and cause it to direct a flame upwardly against the end of the gob which has been in contact with the knife, said burner arranged to travel with the receptacle during the heating thereby of the glass, and means to then withdraw the burner.

3. The combination of means for forming a gob from a supply of molten glass, a mechanical shear to sever the gob from said supply, a carrier by which the severed gob is supported, means to rotate said carrier about a vertical axis and thereby carry the gob away from said supply, a burner supported on said carrier, means to project the burner to an operative position and cause it to travel with the gob and direct a flame against the severed surface of the gob during said travel, means to then withdraw the burner, and means to release the gob from its support after the burner is withdrawn.

4. The combination of a carrier rotatable continuously about a vertical axis, a gob forming receptacle carried thereby open at its lower end to receive a charge of glass, means to dip said receptacle into contact with a pool of molten glass during said rotation and gather a charge of glass by suction, a knife on said carrier, means to project the knife across the bottom of the receptacle to sever the gathered glass from the supply, a burner on said carrier, and means to project the burner laterally to an operative position directly beneath the charge of glass and direct a heating flame vertically upward against the cut end of the glass.

5. The combination of a carrier rotatable continuously about a vertical axis, a gob forming receptacle carried thereby open at its lower end to receive a charge of glass, means to dip said receptacle into contact with a pool of molten glass during said rotation and gather a charge of glass by suction, a knife on said carrier, means to project the knife across the bottom of the receptacle to sever the gathered glass from the supply, a burner on said carrier, means to project the burner laterally to an operative position directly beneath the charge of glass and direct a heating flame vertically upward against the cut end of the glass, means to then withdraw the burner, and means to introduce the glass into a shaping mold.

Signed at Toledo, in the county of Lucas and State of Ohio, this 20th day of October, 1919.

JOHN F. RULE.